E. H. LAYMAN.
VEHICLE TIRE.
APPLICATION FILED MAY 15, 1919.

1,321,220.

Patented Nov. 11, 1919.

INVENTOR.
Estes H. Layman.
BY A. B. Bowman
ATTORNEY

UNITED STATES PATENT OFFICE.

ESTES H. LAYMAN, OF PACIFIC BEACH, CALIFORNIA.

VEHICLE-TIRE.

1,321,220.             Specification of Letters Patent.        Patented Nov. 11, 1919.

Application filed May 15, 1919. Serial No. 297,277.

*To all whom it may concern:*

Be it known that I, ESTES H. LAYMAN, a citizen of the United States, residing at Pacific Beach, in the county of San Diego and State of California, have invented a certain new and useful Vehicle-Tire, of which the following is a specification.

My invention relates to a cushion tire for vehicles and the objects of my invention are: first, to provide a vehicle tire of this class which reduces to a minimum the liability of overheating; second, to provide means for cooling the interior of a cushion tire; third, to provide an inner tube to be used in connection with the conventional casing for providing a resilient tire for vehicles; fourth, to provide a new and novelly constructed inner tube for vehicle tires and fifth, to provide a vehicle tire that is resilient enough for all practical purposes which will not puncture, which is very durable, which will not overheat, which is economical of construction, easy to install and which will not readily deteriorate or get out of order.

Figure 1:
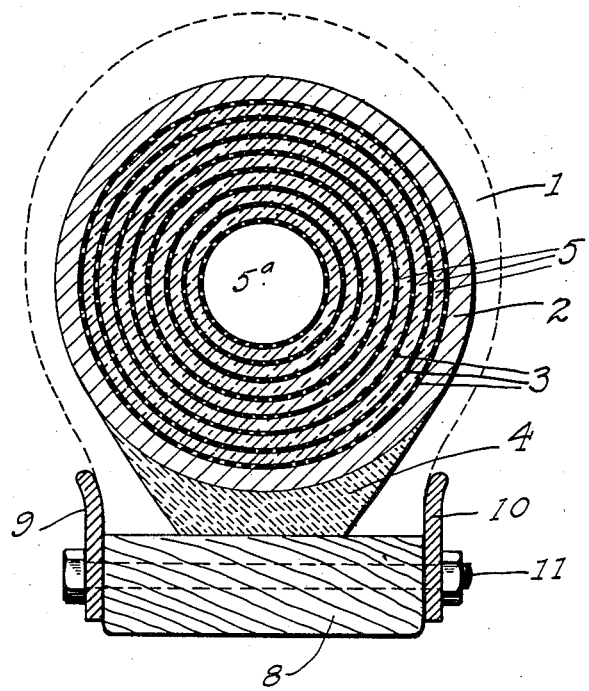
Figure 2:
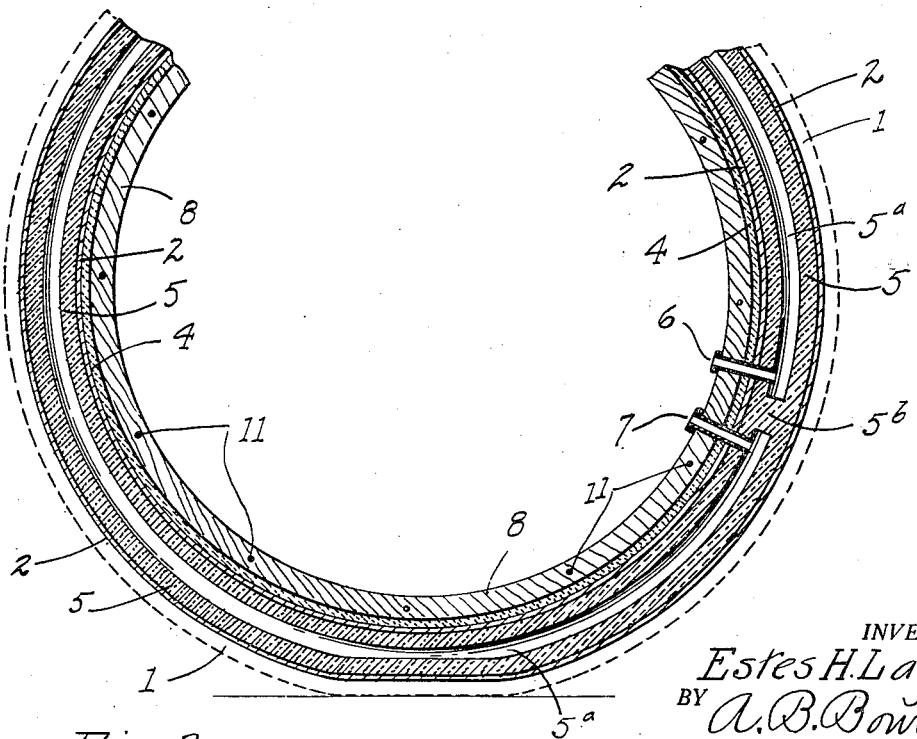

With these and other objects in view as will appear hereinafter, my invention consists of certain novel features of construction, combination and arrangement of parts and portions as will be hereinafter described in detail and particularly set forth in the appended claims, reference being had to the accompanying drawings and to the characters of reference thereon which form a part of this application, in which:

Figure 1 is a transverse sectional view of my tire shown mounted in position on the felly and Fig. 2 is a longitudinal sectional view of a fragmentary portion of said tire on a reduced scale.

Similar characters of reference refer to similar parts and portions throughout the views of the drawings.

The conventional casing 1, hard rubber 2, fabric 3, sponge rubber portion 4, sponge rubber portions 5, air tubes 6 and 7, felly 8, annular supports 9 and 10 and bolts 11 constitute the principal parts and portions of my vehicle tire.

The casing 1 is a conventional form of casing usually used in connection with the pneumatic tubes for vehicle tires, the one shown being a straight side casing. Mounted inside of this casing of sufficient size and shape to fill the interior is an inner tube consisting of a regular rubber compound substance 2 in annular form, a plurality of concentric fabric members 3 with sponge rubber 5 mounted between said fabric members and provided with a longitudinal central hole $5^a$ extending longitudinally in said tube excepting for a slight distance at $5^b$ and provided with an annular section 4 which rests against the felly composed of sponge rubber forming a soft cushion between the member 2 and the felly 8. Communicating with the longitudinal hole $5^a$ at its opposite ends are tubes 6 and 7 which extend inwardly through the felly and are for the purpose of permitting air from the outside to enter the hole $5^a$ and as the wheel revolves passes through said hole and out through the other tube so that with the revolution of the wheel fresh air from the outside is pumped through the hole $5^a$ cooling the interior of said tube. This inner tube together with the conventional casing are secured directly to the felly by means of the annular members 9 and 10 and bolts 11 which extend through the felly.

It is obvious that with this construction there is provided a cushion inner tube for tires with a longitudinal hole therein and with inlet and outlet means for circulating air through the interior of said tube for keeping the same cool. That said tube being composed of sponge rubber combined with fabric and ordinary rubber and the conventional casing provides a very resilient tire which performs practically all of the functions of the pneumatic tire, but it will not puncture and is very durable.

Having thus described my invention what I claim as new and desire to secure by Letters Patent, is:

1. In a tire of the class described, the combination with the conventional casing, of an inner tube provided with a longitudinal hole therein, provided with spaced apart ends, means for admitting air into one of the ends of said longitudinal hole and an exit means for the air at the other end of said longitudinal hole.

2. In a tire of the class described, the combination with the conventional casing, of an inner tube provided with a longitudinal hole therein, provided with spaced apart ends, means for admitting air into one of the ends of said longitudinal hole, an exit means for the air at the other end of said longitudinal hole and alternate layers of sponge rubber and fabric surrounding said hole.

3. In a tire of the class described, the combination with the conventional casing, of an inner tube provided with a longitudinal hole therein, provided with spaced apart ends, means for admitting air into one end of said longitudinal hole, an exit means for the air at the other end of said longitudinal hole, alternate layers of sponge rubber and fabric surrounding said hole, a layer of ordinary rubber surrounding said sponge rubber and fabric and a sponge rubber cushion between said ordinary rubber and the felly.

4. In a tire of the class described, the combination with the conventional casing, of an inner tube provided with a longitudinal hole therein, provided with spaced apart ends, means for admitting air into one end of said longitudinal hole, an exit means for the air at the other end of said longitudinal hole, alternate layers of sponge rubber and fabric surrounding said hole, a layer of ordinary rubber surrounding said sponge rubber and fabric, a sponge rubber cushion between said ordinary rubber and the felly and means for securing said tube and conventional casing to a vehicle wheel felly.

In testimony whereof, I have hereunto set my hand at San Diego, California this 10th day of May 1919.

ESTES H. LAYMAN.